UNITED STATES PATENT OFFICE.

THADDEUS HYATT, OF ATCHISON, KANSAS.

IMPROVEMENT IN RENDERING SAFES AND OTHER STRUCTURES FIRE-PROOF, AND PROTECTING THE SAME AGAINST CORROSION.

Specification forming part of Letters Patent No. 86,547, dated February 2, 1869.

*To all whom it may concern:*

Be it known that I, THADDEUS HYATT, of Atchison, Kansas, have made a new and useful Improvement in Rendering Safes and other Structures Fire-Proof; and I do hereby declare the following to be a full and exact description of the same.

My improvement in fire-proof safes consists not only in the mode of constructing the shell or "strong box" with reference to its fire-resisting qualities, but also in a new process for combining water with plaster-of-paris, by means of which, while increasing the weight, I do not increase the volume of water. In this way I am able to practically surround the central space or cave with a wall of solidified water.

Plaster-of-paris and water, as usually mixed by safe-makers, is a hap-hazard combination as to proportions, the purpose being to have sufficient water to "set" the plaster; but my combination is a scientific one, in which plaster is used merely to solidify water, the difference between the methods being that, whereas, by the ordinary one, but a percentage only of the compound which fills the entire space is water, by my method the water actually fills up the entire space, notwithstanding the addition of an amount of plaster which is equal to one-third the weight of the water. As a curious discovery, merely, this fact is worthy of attention from scientific men; for here is a solid body, (plaster,) not soluble, and here is an incompressible body, (water,) both occupying a space which the water alone, by itself, would require—a phenomenon which gives rise to the query, whether the incompressibility of water may not be merely a latent state of the elasticity of the gases which compose water.

Fire-proof safes are of three kinds—" dry safes," "wet safes," and "steam-safes." The first is filled with dry plaster and some salt, the second with plaster, or its equivalent, holding water by absorption, and the third has simple water contained in metal cases as the "filling." This makes a dry safe; but there is danger, in a fire, that the metal cases may become emptied of their contents by steam-pressure, or at any time by leakage arising from accident. My improvement is on this style of safe, for, instead of resorting to some kind of mechanical contrivance to insure the water-vessels against losing their contents, I employ chemical means, and fill the vessels with just as large a volume of water as could be used in its fluid state, in combination with mechanical means, and then I solidify it by means of that quantity of plaster that will do this without increasing its volume.

The following is the plan I pursue: I make the external shell or strong box in the ordinary way of making them as to strength; then, to prevent its power of radiating heat when exposed to flame, as it would do, being iron, I line it on the inside with some good, dry, slow conductor of heat, after the method pursued in constructing ordinary steam-safes. I then make a series of water-vessels out of copper or other non-oxidizable metal, and shape them like bricks or long flat tubes, so as to have them lie snugly together, and form, when in place, a complete lining to the safe. Each tube or vessel is formed of one continuous sheet as to three of its sides, the fourth being soldered on, so that, in a fire, this one becomes loosened by the melting of the solder, and thus allows the escape of its steam.

I make the filling of these tubes in the following way: Taking the quantity of water necessary to fill the tube, I weigh it, and then I take of plaster-of-paris a quantity equaling one-third the weight of the water, which I add to the water. As it requires about twenty minutes for the water to become solidified, it is necessary to occasionally stir the mass to prevent the plaster from all settling to the bottom of the vessel.

There is yet another way in which I reduce the principle of my discovery to practice, viz: Instead of filling the solidified water into a series of vessels, I use only one, and shape this exactly like the external shell, so that when in position the inner one just fills the place. This makes the construction, in effect, two safes, one within the other, the outer representing the strength of the safe and the inner one its fire-proof quality. This inner safe is made of copper or other light non-oxidizable metal, is a double-walled safe, and water-tight. The central space of this safe is the "cave," in which to keep the effects which are to be secured against fire. The space within the walls of this safe I fill with water, and solidify it in the manner already described.

I have said that this inner safe exactly fills the outer one. It is evident that it may be made smaller, and then the intervening space between the two may be filled with some slow conductor like baked mud, fire-brick, or dried cement.

There is also still a third mode of reducing my discovery to practice, which is as follows, viz: by making the strong box itself double-walled and of galvanized iron, water-tight, and filling the space between the walls with solidified water, as described. In this mode of construction I provide a number of suitable apertures for escape of steam into the interior of the safe or cave, and these apertures I cover by thin metal plates soldered on, so that, on the melting of the solder, the plates will drop off and let out steam.

The points of my invention would then be as follows, viz: First, where I put the filling into the walls of the actual safe itself, I make this safe of galvanized iron, in order to secure a non-oxidizable vessel and water-tight soldered joints; and as to this method of constructing a safe, I claim a safe constructed of galvanized iron when filled with solidified water, as herein described, or with set plaster or its equivalent, for this would make a dry safe of good construction if the wet filling were even of the ordinary character, the objection to safes with wet filling being that the filling is not put into an air and water tight space, except in the "Horsford safe," and there the iron walls are merely protected from rusting out by means of some sort of paint or resinous coating. Second, where I put the filling into a separate interior safe, I am able to make the outer one in a simple manner, and in many cases more adaptable to certain required conditions—as, for example, where a chilled-iron safe is required, or one of extra burglar-proof character. The point of the invention here is constructing a fire-proof safe where the wet filling is secured within an air and water tight double-walled interior non-oxidizable safe, while the outer safe or strong box is the actual protection against burglary, provision for the escape of steam being the same as previously described. Third, where I use a series of vessels or tubes. The point of the invention here is that, while this is the simplest and cheapest construction, and not new as to this point, yet it is new as to filling such water-vessels with water, prevented from getting out by being held there by a chemical instead of mechanical contrivance, as fully herein set forth.

What I claim as my invention, and desire to secure by Letters Patent, is—

The within-described method of constructing fire-proof safes.

THADDEUS HYATT.

Witnesses:
   JOHN S. HOLLINGSHEAD,
   PATRICK SUGHRUE.